US012749455B2

(12) United States Patent

Lee et al.

(10) Patent No.: US 12,749,455 B2

(45) Date of Patent: Sep. 29, 2026

(54) DISPLAY DEVICE CONFIGURED TO PROVIDE AN OFFSET SIGNAL DURING A SELF-SCAN PERIOD

(71) Applicant: Samsung Display Co., Ltd., Yongin-si (KR)

(72) Inventors: Kon Haeng Lee, Yongin-si (KR); Chang Woo Kahng, Yongin-si (KR); Won Tae Kim, Yongin-si (KR); Jung Kook Park, Yongin-si (KR); Yong Je Jeon, Yongin-si (KR); Seok Hyun Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/215,148

(22) Filed: May 21, 2025

(65) Prior Publication Data

US 2026/0094574 A1 Apr. 2, 2026

(30) Foreign Application Priority Data

Sep. 30, 2024 (KR) ........................ 10-2024-0132971

(51) Int. Cl.

*G09G 3/3266* (2016.01)
*G09G 3/3233* (2016.01)

(52) U.S. Cl.

CPC ......... *G09G 3/3266* (2013.01); *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/0233* (2013.01); *G09G 2330/021* (2013.01)

(58) Field of Classification Search

USPC .......................................................... 345/212

See application file for complete search history.

(56) References Cited

U.S. PATENT DOCUMENTS

| | | | | |
|---|---|---|---|---|
| 11,108,023 | B2 | 8/2021 | Sim et al. | |
| 2023/0306906 | A1 | 9/2023 | Yang et al. | |
| 2023/0335044 | A1* | 10/2023 | An | G09G 3/3233 |
| 2024/0038161 | A1* | 2/2024 | Zeng | G09G 3/3233 |
| 2024/0257739 | A1* | 8/2024 | Noh | G09G 3/3233 |

FOREIGN PATENT DOCUMENTS

KR 10-2583619 B1 9/2023

* cited by examiner

*Primary Examiner* — Nathan P Brittingham

(74) *Attorney, Agent, or Firm* — Womble Bond Dickinson (US) LLP

(57) ABSTRACT

A display device includes: a display panel including a sub-pixel connected to a first sub-gate line and a second sub-gate line; a gate driver configured to supply a first sub-gate signal through the first sub-gate line and a second sub-gate signal through the second sub-gate line to the sub-pixel during a display scan period; and a voltage generator configured to provide an offset signal to the first sub-gate line during a self scan period in which supply of the second sub-gate signal is stopped.

20 Claims, 10 Drawing Sheets

SELF SCAN

DISPLAY DEVICE CONFIGURED TO PROVIDE AN OFFSET SIGNAL DURING A SELF-SCAN PERIOD

The present application claims priority to and the benefit of Korean Patent Application No. 10-2024-0132971, filed on Sep. 30, 2024, in the Korean Intellectual Property Office, the entire disclosure of which is incorporated herein by reference.

BACKGROUND

1. Field

Aspects of some embodiments of the present disclosure relate to a display device and an electronic device including the same.

2. Description of the Related Art

As information technology develops, importance of a display device, which is a connection medium between a user and information, is emerging. In response to this, a use of a display device such as a liquid crystal display device and an organic light emitting display device is increasing.

Each of pixels may include an initialization transistor and a compensation transistor for compensating for a threshold voltage deviation of a driving transistor.

For example, the display device may operate at a variable driving frequency. For example, the display device may be driven at a low driving frequency while displaying a still image, and may be driven at a high driving frequency while displaying a moving image. In order to reduce power consumption in case of driving at a low driving frequency, during a self scan period in which a gate signal applied to the initialization transistor and the compensation transistor is not supplied, a period of a clock signal provided to a gate driver may be increased compared to a display scan period in which the gate signal applied to the initialization transistor and the compensation transistor is supplied.

As the period of the clock signal provided to the gate driver during the self scan period is increased, a floating period of a gate driver output terminal may be increased, and thus a problem in which a difference of a turn-on level of a signal output from the gate driver occurs between the self scan period and the display scan period may occur.

The above information disclosed in this Background section is only for enhancement of understanding of the background and therefore the information discussed in this Background section does not necessarily constitute prior art.

SUMMARY

Aspects of some embodiments of the present disclosure include a display device and an electronic device including the same in which a turn-on level of a transistor during a self scan period may maintain a turn-on level of the transistor during a display scan period.

According to some embodiments of the disclosure, a display device may include a display panel including a sub-pixel connected to a first sub-gate line and a second sub-gate line, a gate driver configured to supply a first sub-gate signal through the first sub-gate line and a second sub-gate signal through the second sub-gate line to the sub-pixel during a display scan period, and a voltage generator configured to provide an offset signal to the first sub-gate line during a self scan period in which supply of the second sub-gate signal is stopped.

According to some embodiments, the sub-pixel may include at least one P-type transistor, a first voltage level may be a turn-on voltage level of a sub-gate signal applied to a gate electrode of the P-type transistor during the display scan period, a second voltage level may be a turn-on voltage level of the sub-gate signal applied to the gate electrode of the P-type transistor during the self scan period, and the offset signal may have an offset voltage level that is a difference between the first voltage level and the second voltage level during the self scan period.

According to some embodiments, the offset signal may have '0V' during the display scan period.

According to some embodiments, the first voltage level may be a turn-on voltage level of the first sub-gate signal output from the gate driver during the display scan period, and the second voltage level may be a turn-on voltage level of the first sub-gate signal output from the gate driver during the self scan period.

According to some embodiments, the sub-pixel may include a first transistor connected between a first node and a second node receiving a first power voltage, including a gate electrode connected to a third node, and generating a driving current, a second transistor providing a data voltage to the first node in response to the first sub-gate signal, and a third transistor connecting the second node and the third node in response to the second sub-gate signal.

According to some embodiments, the first voltage level may be greater than the second voltage level.

According to some embodiments, a turn-on voltage level applied to a gate electrode of the second transistor during the self scan period may be a sum of the second voltage level and the offset voltage level.

According to some embodiments, the turn-on voltage level applied to the gate electrode of the second transistor during the display scan period and the self scan period may be the first voltage level.

According to some embodiments, the first transistor and the second transistor may be P-type transistors, and the third transistor may be an N-type transistor.

According to some embodiments, the sub-pixel may include a fourth transistor connected between the third node and a first initialization voltage node, and having a gate electrode connected to a third sub-gate line, a fifth transistor connected between a first power voltage node receiving the first power voltage and the first node, and having a gate electrode connected to an emission control line, a sixth transistor connected between the second node and the fourth node, and having a gate electrode connected to the emission control line, a seventh transistor connected between a second initialization voltage node and the fourth node, and having a gate electrode connected to a fourth sub-gate line, an eighth transistor connected between a bias voltage node and the first node, and having a gate electrode connected to the fourth sub-gate line, a storage capacitor connected between the first power voltage node and the third node, and a light emitting element connected between the fourth node and a second power voltage node, and emitting light based on a driving current received by the fourth node.

According to some embodiments, the display scan period may include a first initialization period, a data writing period, a second initialization period, and an emission period, during the first initialization period, the gate driver may supply a third sub-gate signal to the third sub-gate line, during the data writing period, the gate driver may supply a first sub-gate signal to the first sub-gate line and supplies a second sub-gate signal to the second sub-gate line, during the second initialization period, the gate driver may supply a fourth sub-gate signal to the fourth sub-gate line, and during the emission period, the gate driver may supply an emission control signal to the emission control line.

According to some embodiments, during the self scan period, the gate driver may stop supply of the second sub-gate signal and the third sub-gate signal.

According to some embodiments, the self scan period may include a bias period and an emission period, during the self scan period, the gate driver may supply the fourth sub-gate signal to the fourth sub-gate line, and during the emission period, the gate driver may supply the emission control signal to the emission control line.

According to some embodiments, the voltage generator may provide the offset signal to the fourth sub-gate line during the bias period, and provide the offset signal to the emission control line during the emission period.

According to some embodiments, the first transistor, the second transistor, the fifth transistor, the sixth transistor, the seventh transistor, and the eighth transistor may be P-type transistors, and the third transistor and the fourth transistor may be N-type transistors.

According to some embodiments of the disclosure, an electronic device may include a processor configured to generate input image data and a control signal, and a display device configured to display an image, based on the input image data and the control signal, and the display device may include a display panel including a sub-pixel connected to a first sub-gate line and a second sub-gate line, a gate driver configured to supply a first sub-gate signal through the first sub-gate line and a second sub-gate signal through the second sub-gate line to the sub-pixel during a display scan period, a voltage generator configured to provide an offset signal to the first sub-gate line during a self scan period in which supply of the second sub-gate signal is stopped, and a controller configured to control the display panel, the gate driver, and the voltage generator, based on the input image data and the control signal.

According to some embodiments, the sub-pixel may include at least one P-type transistor, a first voltage level may be a turn-on voltage level of a sub-gate signal applied to a gate electrode of the P-type transistor during the display scan period, a second voltage level may be a turn-on voltage level of the sub-gate signal applied to the gate electrode of the P-type transistor during the self scan period, and the offset signal may have an offset voltage level that is a difference between the first voltage level and the second voltage level during the self scan period.

According to some embodiments, the first voltage level may be a turn-on voltage level of the first sub-gate signal output from the gate driver during the display scan period, and the second voltage level may be a turn-on voltage level of the first sub-gate signal output from the gate driver during the self scan period.

According to some embodiments, the sub-pixel may include a first transistor connected between a first node and a second node receiving a first power voltage, including a gate electrode connected to a third node, and generating a driving current, a second transistor providing a data voltage to the first node in response to the first sub-gate signal, and a third transistor connecting the second node and the third node in response to the second sub-gate signal.

According to some embodiments, a turn-on voltage level applied to a gate electrode of the second transistor during the self scan period may be a sum of the second voltage level and the offset voltage level.

The display device according to some embodiments of the present disclosure may prevent or reduce a luminance difference between low-frequency driving and high-frequency driving and relatively improve image quality by maintaining the turn-on level of the transistor during the self scan period at the turn-on level of the transistor during the display scan period.

BRIEF DESCRIPTION OF THE DRAWINGS

The above and other features and characteristics of embodiments according to the present disclosure will become more apparent by describing in further detail aspects of some embodiments thereof with reference to the accompanying drawings, in which.

DETAILED DESCRIPTION

Figure 1:
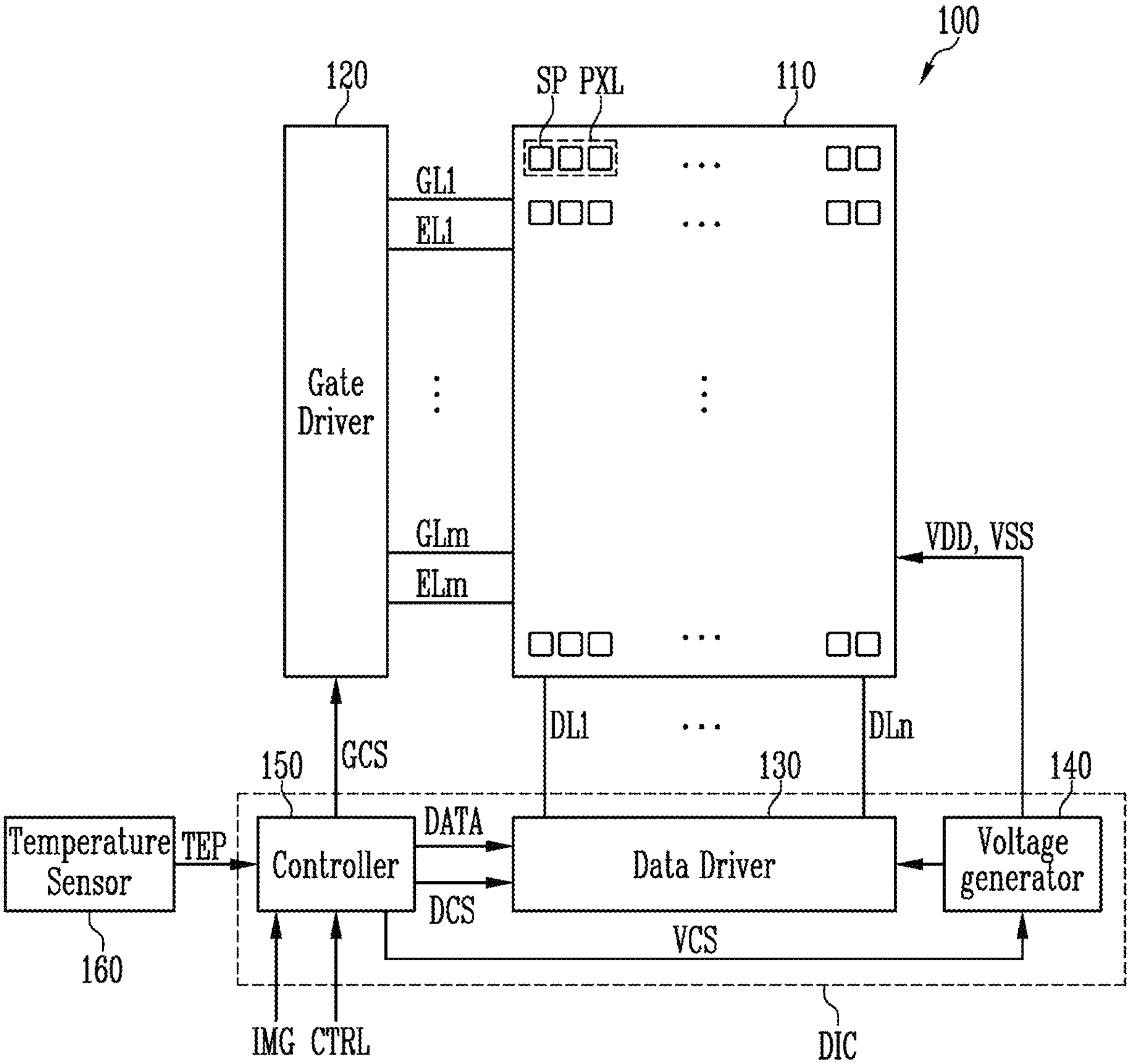
FIG. 1 is a block diagram illustrating aspects of a display device according to some embodiments.

Hereinafter, aspects of some embodiments of the present disclosure are described in more detail with reference to the accompanying drawings. It should be noted that in the following description, only portions necessary for understanding an operation according to the disclosure are described, and descriptions of other portions are omitted in order not to obscure the subject matter of the disclosure. In addition, the disclosure may be embodied in other forms without being limited to the embodiments described herein. However, the embodiments described herein is provided to describe in detail enough to easily implement the technical spirit of the disclosure to those skilled in the art to which the disclosure belongs.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the disclosure. Throughout the specification, in a case where a certain portion "includes", the case means that the portion may further include another component without excluding another component unless otherwise stated. "At least any of X, Y, and Z" and "at least any selected from a group consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Here, terms such as first and second may be used to describe various components, but these components are not limited to these terms. These terms are used to distinguish one component from another component. Therefore, a first component may refer to a second component within a range without departing from the scope disclosed herein.

Spatially relative terms such as "under", "on", and the like may be used for descriptive purposes, thereby describing a relationship between one element or feature and another element(s) or feature(s) as shown in the drawings. Spatially relative terms are intended to include other directions in use, in operation, and/or in manufacturing, in addition to the direction depicted in the drawings. For example, in case that a device shown in the drawing is turned upside down, elements depicted as being positioned "under" other elements or features are positioned in a direction "on" the other elements or features. Therefore, according to some embodiments of the present disclosure, the term "under" may include both directions of on and under. In addition, the device may face in other directions (for example, rotated 90 degrees or in other directions) and thus the spatially relative terms used herein are interpreted according thereto.

Various embodiments are described with reference to drawings schematically illustrating ideal embodiments. Accordingly, it will be expected that shapes may vary, for example, according to tolerances and/or manufacturing techniques. Therefore, the embodiments disclosed herein cannot be construed as being limited to shown specific shapes, and should be interpreted as including, for example, changes in shapes that occur as a result of manufacturing. As described above, the shapes shown in the drawings may not show actual shapes of areas of a device, and the present embodiments are not limited thereto.

FIG. 1 is a block diagram illustrating aspects of a display device according to some embodiments.

Referring to FIG. 1, the display device 100 may include a display panel 110, a gate driver 120, a data driver 130, a voltage generator 140, and a controller 150.

The display panel 110 includes sub-pixels SP. The sub-pixels SP may be connected to the gate driver 120 through first to m-th gate lines GL1 to GLm. The sub-pixels SP may be connected to the data driver 130 through first to n-th data lines DL1 to DLn.

Each of the sub-pixels SP may include at least one light emitting element configured to generate light. Accordingly, each of the sub-pixels SP may generate light of a specific color such as red, green, blue, cyan, magenta, or yellow. Two or more sub-pixels among the sub-pixels SP may configure one pixel PXL. For example, as shown in FIG. 1, three sub-pixels may configure one pixel PXL.

The gate driver 120 is connected to the sub-pixels SP arranged in a row direction through the first to m-th gate lines GL1 to GLm. The gate driver 120 may output gate signals to the first to m-th gate lines GL1 to GLm in response to a gate control signal GCS. According to some embodiments, the gate control signal GCS may include a start signal indicating a start of each frame, a horizontal synchronization signal for outputting the gate signals in synchronization with a timing at which data signals are applied, and the like.

According to some embodiments, first to m-th emission control lines EL1 to ELm connected to the sub-pixels SP of the row direction may be further provided. In this case, the gate driver 120 may include an emission control driver configured to control the first to m-th emission control lines EL1 to ELm, and the emission control driver may operate under control of the controller 150.

The gate driver 120 may be located on one side of the display panel 110. However, embodiments are not limited thereto. For example, the gate driver 120 may be divided into two or more physically and/or logically divided drivers, and such drivers may be located on one side of the display panel 110 and another side of the display panel 110 opposite the one side. As described above, the gate driver 120 may be located around the display panel 110 in various shapes according to some embodiments.

The data driver 130 is connected to the sub-pixels SP arranged in a column direction through the first to n-th data lines DL1 to DLn. The data driver 130 receives image data DATA and a data control signal DCS from the controller 150. The data driver 130 operates in response to the data control signal DCS. According to some embodiments, the data control signal DCS may include a source start pulse, a source shift clock, a source output enable signal, and the like.

The data driver 130 may apply data signals having grayscale voltages corresponding to the image data DATA to the first to n-th data lines DL1 to DLn using voltages from the voltage generator 140. The data signals corresponding to the image data DATA may be applied to the data lines DL1 to DLm in case that the gate signal is applied to each of the first to m-th gate lines GL1 to GLm. Accordingly, the corresponding sub-pixels SP may generate light corresponding to the data signals. Accordingly, an image is displayed on the display panel 110.

According to some embodiments, the gate driver 120 and the data driver 130 may include complementary metal-oxide semiconductor (CMOS) circuit elements.

The voltage generator 140 may operate in response to a voltage control signal VCS from the controller 150. The voltage generator 140 is configured to generate a plurality of voltages and provide the generated voltages to components of the display device 100. For example, the voltage generator 140 may be configured to generate the plurality of voltages by receiving an input voltage from an outside of the display device 100, adjusting the received voltage, and regulating the adjusted voltage.

The voltage generator 140 may generate a first power voltage VDD and a second power voltage VSS, and the generated first and second driving voltages VDD and VSS may be provided to the sub-pixels SP. The first power voltage VDD may have a relatively high voltage level, and the second power voltage VSS may have a voltage level lower than that of the first power voltage VDD. According to some embodiments, the first power voltage VDD or the second power voltage VSS may be provided by an external device of the display device 100.

In addition, the voltage generator 140 may generate various voltages. For example, the voltage generator 140 may generate an initialization voltage applied to the sub-pixels SP. For example, during a sensing operation for sensing electrical characteristics of transistors and/or light emitting elements of the sub-pixels SP, a predetermined reference voltage may be applied to the first to n-th data lines DL1 to DLn, and the voltage generator 140 may generate such a reference voltage.

The controller 150 controls overall operations of the display device 100. The controller 150 receives input image data IMG and a control signal CTRL for controlling display of the input image data IMG from the outside. The controller 150 may provide the gate control signal GCS, the data control signal DCS, and the voltage control signal VCS in response to the control signal CTRL.

The controller 150 may convert the input image data IMG so that the input image data IMG is suitable for the display device 100 or the display panel 110 and output the image data DATA. According to some embodiments, the controller 150 may output the image data DATA by aligning the input image data IMG so that the input image data IMG is suitable for the sub-pixels SP of a row unit.

Two or more components of the data driver 130, the voltage generator 140, and the controller 150 may be mounted on one integrated circuit. As shown in FIG. 1, the data driver 130, the voltage generator 140, and the controller 150 may be included in a driver integrated circuit DIC. In this case, the data driver 130, the voltage generator 140, and the controller 150 may be functionally divided components in one driver integrated circuit DIC. According to some embodiments, at least one of the data driver 130, the voltage generator 140, or the controller 150 may be provided as a component distinguished from the driver integrated circuit DIC.

The display device 100 may include at least one temperature sensor 160. The temperature sensor 160 is configured to sense a temperature around the temperature sensor 160 and generate temperature data TEP indicating the sensed temperature. According to some embodiments, the temperature sensor 160 may be located adjacent to the display panel 110 and/or the driver integrated circuit DIC.

The controller 150 may control various operations of the display device 100 in response to the temperature data TEP. According to some embodiments, the controller 150 may adjust a luminance of the image output from the display panel 110 in response to the temperature data TEP. For example, the controller 150 may control the data signals and the first and second power voltages VDD and VSS by controlling components such as the data driver 130 and/or the voltage generator 140.

Figure 2:
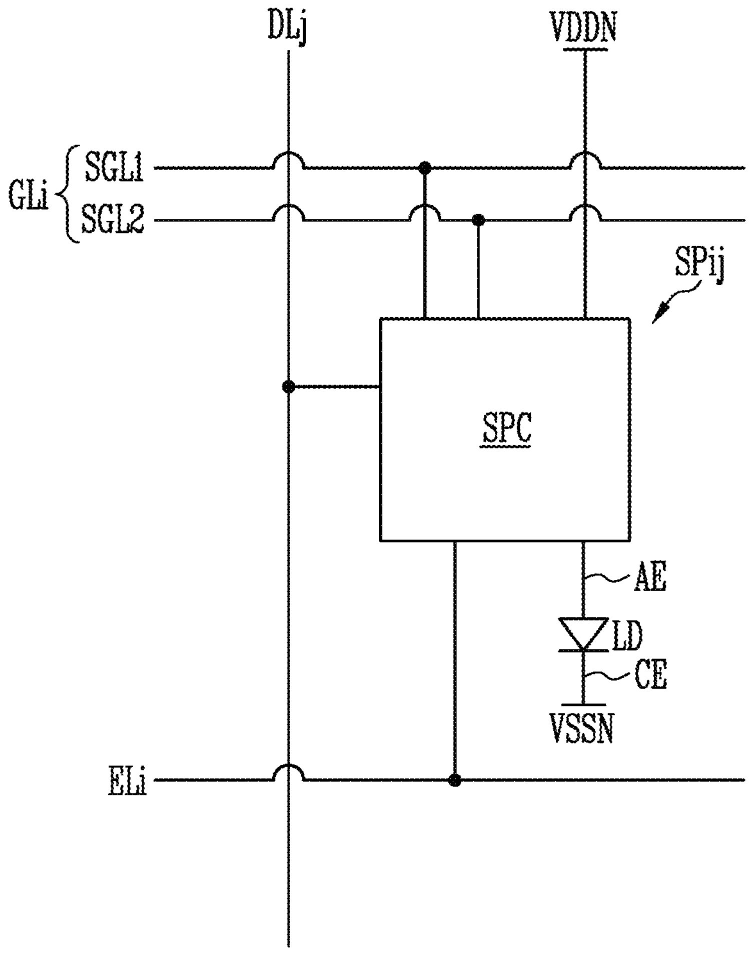
FIG. 2 is a block diagram illustrating aspects of one of sub-pixels of FIG. 1 according to some embodiments.

FIG. 2 is a block diagram illustrating aspects of one of the sub-pixels of FIG. 1, according to some embodiments. In FIG. 2, among the sub-pixels SP of FIG. 1, a sub-pixel SPij arranged in an i-th row (i is an integer greater than or equal to 1 and less than or equal to m) and a j-th column (j is an integer greater than or equal to 1 and less than or equal to n) is shown as an example.

Referring to FIG. 2, the sub-pixel SPij may include a sub-pixel circuit SPC and a light emitting element LD.

The light emitting element LD is connected between a first power voltage node VDDN and a second power voltage node VSSN. At this time, the first power voltage node VDDN is a node that transmits the first power voltage VDD of FIG. 1, and the second power voltage node VSSN is a node that transmits the second power voltage VSS of FIG. 1.

An anode electrode AE of the light emitting element LD may be connected to the first power voltage node VDDN through the sub-pixel circuit SPC, and a cathode electrode CE of the light emitting element LD may be connected to the second power voltage node VSSN. For example, the anode electrode AE of the light emitting element LD may be connected to the first power voltage node VDDN through one or more transistors included in the sub-pixel circuit SPC.

The sub-pixel circuit SPC may be connected to an i-th gate line GLi among the first to m-th gate lines GL1 to GLm of FIG. 1, an i-th emission control line ELi among the first to m-th emission control lines EL1 to ELm of FIG. 1, and a j-th data line DLj among the first to n-th data lines DL1 to DLn of FIG. 1. The sub-pixel circuit SPC is configured to control the light emitting element LD according to signals received through these signal lines.

The sub-pixel circuit SPC may operate in response to a gate signal received through the i-th gate line GLi. The i-th gate line GLi may include one or more sub-gate lines. According to some embodiments, as shown in FIG. 2, the i-th gate line GLi may include first and second sub-gate lines SGL1 and SGL2. The sub-pixel circuit SPC may operate in response to gate signals received through the first and second sub-gate lines SGL1 and SGL2. The sub-pixel circuit SPC may operate in response to gate signals received through corresponding sub-gate lines in case that the i-th gate line GLi includes two or more sub-gate lines as described above.

The sub-pixel circuit SPC may operate in response to an emission control signal received through the i-th emission control line ELi. According to some embodiments, the i-th emission control line ELi may include one or more sub-emission control lines. The sub-pixel circuit SPC may operate in response to emission control signals received through corresponding sub-emission control lines in case that the i-th emission control line ELi includes two or more sub-emission control lines.

The sub-pixel circuit SPC may receive a data signal through the j-th data line DLj. The sub-pixel circuit SPC may store a voltage corresponding to the data signal in response to at least one of gate signals received through the first and second sub-gate lines SGL1 and SGL2. The sub-pixel circuit SPC may control a current flowing from the first power voltage node VDDN to the second power voltage node VSSN through the light emitting element LD according to the stored voltage, in response to the emission control signal received through the i-th emission control line ELi. Accordingly, the light emitting element LD may generate light of a luminance corresponding to the data signal.

Figure 3:
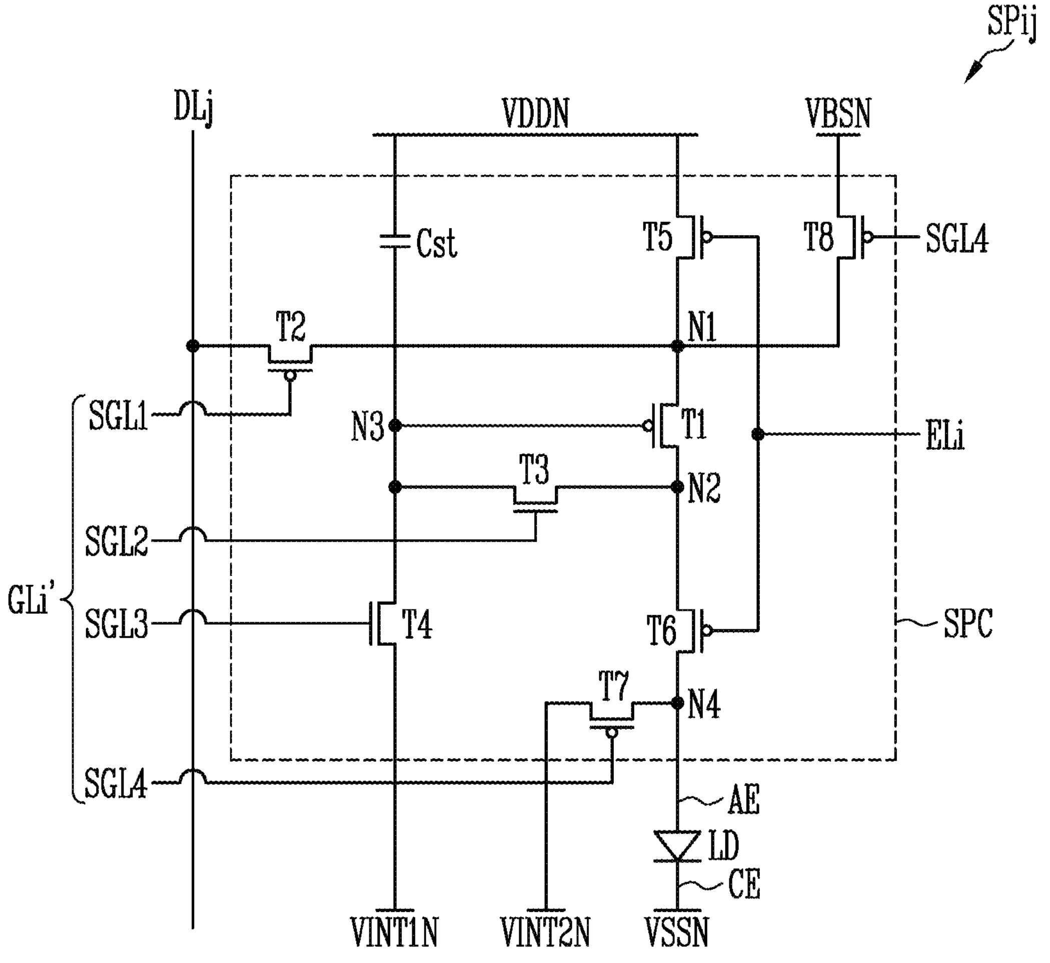
FIG. 3 is a circuit diagram illustrating aspects of the sub-pixel of FIG. 2 according to some embodiments.

FIG. 3 is a circuit diagram illustrating aspects of the sub-pixel of FIG. 2 according to some embodiments. Although FIG. 3 illustrates various components in a sub-pixel according to some embodiments, embodiments according to the present disclosure are not limited thereto, and according to some embodiments, the sub-pixel may include additional components, or fewer components, without departing from the spirit and scope of embodiments according to the present disclosure.

Referring to FIG. 3, the sub-pixel SPij may include a sub-pixel circuit SPC and a light emitting element LD.

The sub-pixel circuit SPC may be connected to an i-th gate line GLi', the i-th emission control line ELi, and the j-th data line DLj. Compared to the i-th gate line GLi of FIG. 2, the i-th gate line GLi' may further include a third sub-gate line SGL3 and a fourth sub-gate line SGL4.

The sub-pixel circuit SPC may include first to eighth transistors T1 to T8, and a storage capacitor Cst.

The first transistor T1 is connected between a first node N1 and a second node N2 receiving the first power voltage. A gate electrode of the first transistor T1 may be connected to a third node N3, and thus the first transistor T1 may be turned on according to a voltage level of the third node N3. The first transistor T1 may be referred to as a driving transistor.

The second transistor T2 is connected between the j-th data line DLj and the first node N1. A gate electrode of the second transistor T2 may be connected to the first sub-gate line SGL1, and thus the second transistor T2 may be turned on in response to the sub-gate signal of the first sub-gate line SGL1. A data voltage may be provided to the first node N1 in case that the second transistor T2 is turned on. The second transistor T2 may be referred to as a switching transistor.

The third transistor T3 is connected between the second node N2 and the third node N3. A gate electrode of the third transistor T3 may be connected to the second sub-gate line SGL2, and thus the third transistor T3 may be turned on in response to the sub-gate signal of the second sub-gate line SGL2. The second node N2 and the third node N3 may be connected in case that the third transistor T3 is turned on.

The fourth transistor T4 is connected between the third node N3 and a first initialization voltage node VINT1N. The first initialization voltage node VINT1N is configured to transmit a first initialization voltage. According to some embodiments, the first initialization voltage may be provided by the voltage generator 140 of FIG. 1.

A gate electrode of the fourth transistor T4 may be connected to the third sub-gate line SGL3, and thus the fourth transistor T4 may be turned on in response to a sub-gate signal of the third sub-gate line SGL3. The fourth transistor T4 may be referred to as a gate initialization transistor.

The fifth transistor T5 is connected between the first power voltage node VDDN and the first node N1. A gate electrode of the fifth transistor T5 may be connected to the i-th emission control line ELi, and thus the fifth transistor T5 may be turned on in response to the emission control signal of the i-th emission control line ELi. The first node N1 may receive the first power voltage through the fifth transistor T5.

The sixth transistor T6 is connected between the second node N2 and a fourth node N4 (that is, the anode electrode of the light emitting element LD). A gate electrode of the sixth transistor T6 may be connected to the i-th emission control line ELi, and thus the sixth transistor T6 may be turned on in response to the emission control signal of the i-th emission control line ELi.

The seventh transistor T7 is connected between the fourth node N4 and a second initialization voltage node VINT2N. The second initialization voltage node VINT2N is configured to transmit a second initialization voltage. According to some embodiments, the second initialization voltage may be provided by the voltage generator 140 of FIG. 1.

The first initialization voltage and the second initialization voltage may have different voltage levels. Accordingly, an initialization voltage supplied to the anode electrode of the light emitting element LD and the initialization voltage supplied to the gate electrode of the first transistor T1 may be set differently.

The seventh transistor T7 may be referred to as an anode initialization transistor. A gate electrode of the seventh transistor T7 may be connected to the fourth sub-gate line SGL4, and thus the seventh transistor T7 may be turned on in response to the sub-gate signal of the fourth sub-gate line SGL4.

The eighth transistor T8 is connected between the first node N1 and a bias voltage node VBSN. The bias voltage node VBSN is configured to transmit a bias voltage. According to some embodiments, the bias voltage may be provided by the voltage generator 140 of FIG. 1.

A gate electrode of the eighth transistor T8 may be connected to the fourth sub-gate line SGL4, and thus the eighth transistor T8 may be turned on in response to the sub-gate signal of the fourth sub-gate line SGL4. The storage capacitor C1 is connected between the first power voltage node VDDN and the third node N3.

As described above, the sub-pixel circuit SPC may include the first to eighth transistors T1 to T8, and the storage capacitor Cst. However, embodiments according to the present disclosure are not limited thereto.

The sub-pixel circuit SPC may be implemented as one of various types of circuits including a plurality of transistors and one or more capacitors. For example, the sub-pixel circuit SPC may include two transistors and one capacitor. According to some embodiments of the sub-pixel circuit SPC, the number of sub-gate lines included in the i-th gate line GLi' and the number of sub-emission control lines included in the i-th emission control line ELi may vary.

Each of the first to eighth transistors T1 to T8 may be a metal oxide silicon field effect transistor (MOSFET).

The first transistor T1, the second transistor T2, the fifth transistor T5, the sixth transistor T6, the seventh transistor T7, and the eighth transistor T8 may be P-type transistors. In this case, a turn-on level may be a low voltage level, and a turn-off level may be a high voltage level. For example, the P-type transistor may be turned on in case that a signal applied to a gate electrode of a P-type transistor has a low voltage level. For example, the P-type transistor may be turned off in case that a signal applied to a gate electrode of a P-type transistor has a high voltage level.

The third transistor T3 and the fourth transistor T4 may be N-type transistors. In this case, a turn-on level may be a high voltage level, and a turn-off level may be a low voltage level. The N-type transistor may be turned off in case that a signal applied to a gate electrode of an N-type transistor has a low voltage level. For example, the N-type transistor may be turned on in case that a signal applied to a gate electrode of an N-type transistor has a high voltage level.

However, embodiments according to the present disclosure are not limited thereto. For example, the first transistor T1, the second transistor T2, the fifth transistor T5, the sixth transistor T6, the seventh transistor T7, and the eighth transistor T8 may be implemented as N-type transistors, or the third transistor T3 and the fourth transistor T4 may be implemented as P-type transistors. That is, each of the first to eighth transistors T1 to T8 may be implemented as one of an N-type transistor and a P-type transistor.

Hereinafter, a meaning of "the sub-gate signal is supplied" may be understood as that the sub-gate signal is supplied at a logic level that turns on a transistor controlled thereby. In addition, s meaning of "supply of the sub-gate signal is stopped" may be understood as that the sub-gate signal is supplied at a logic level that turns off the transistor controlled thereby.

In addition, a meaning of "the emission control signal is supplied" may be understood as that the emission control signal is supplied at a logic level that turns on the transistor controlled thereby. In addition, a meaning of "supply of the emission control signal is stopped" may be understood as that the emission control signal is supplied at a logic level that turns off the transistor controlled thereby.

The light emitting element LD may include an anode electrode AE, a cathode electrode CE, and a light emitting layer. The light emitting layer may be located between the anode electrode AE and the cathode electrode CE. After the data signal transmitted through the j-th data line DLj is reflected in the voltage of the third node N3, the fifth and sixth transistors T5 and T6 may be turned on in case that the emission control signal applied to the emission control line ELi is enabled to a low voltage level. In addition, the first transistor T1 may be turned on according to the voltage of the third node N3, and thus a current may flow from the first power voltage node VDDN to the second power voltage node VSSN. The light emitting element LD may emit light according to an amount of flowing current.

Figure 4:
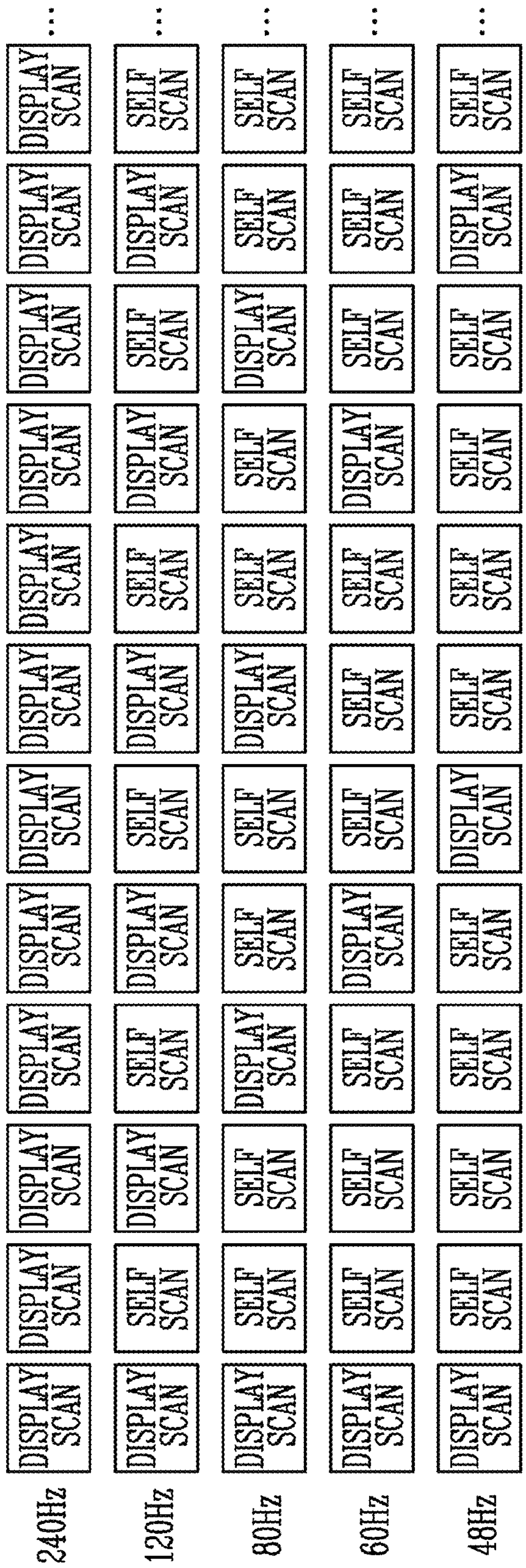
FIG. 4 is a conceptual diagram illustrating a driving operation of the display device of FIG. 1.
Figure 5:
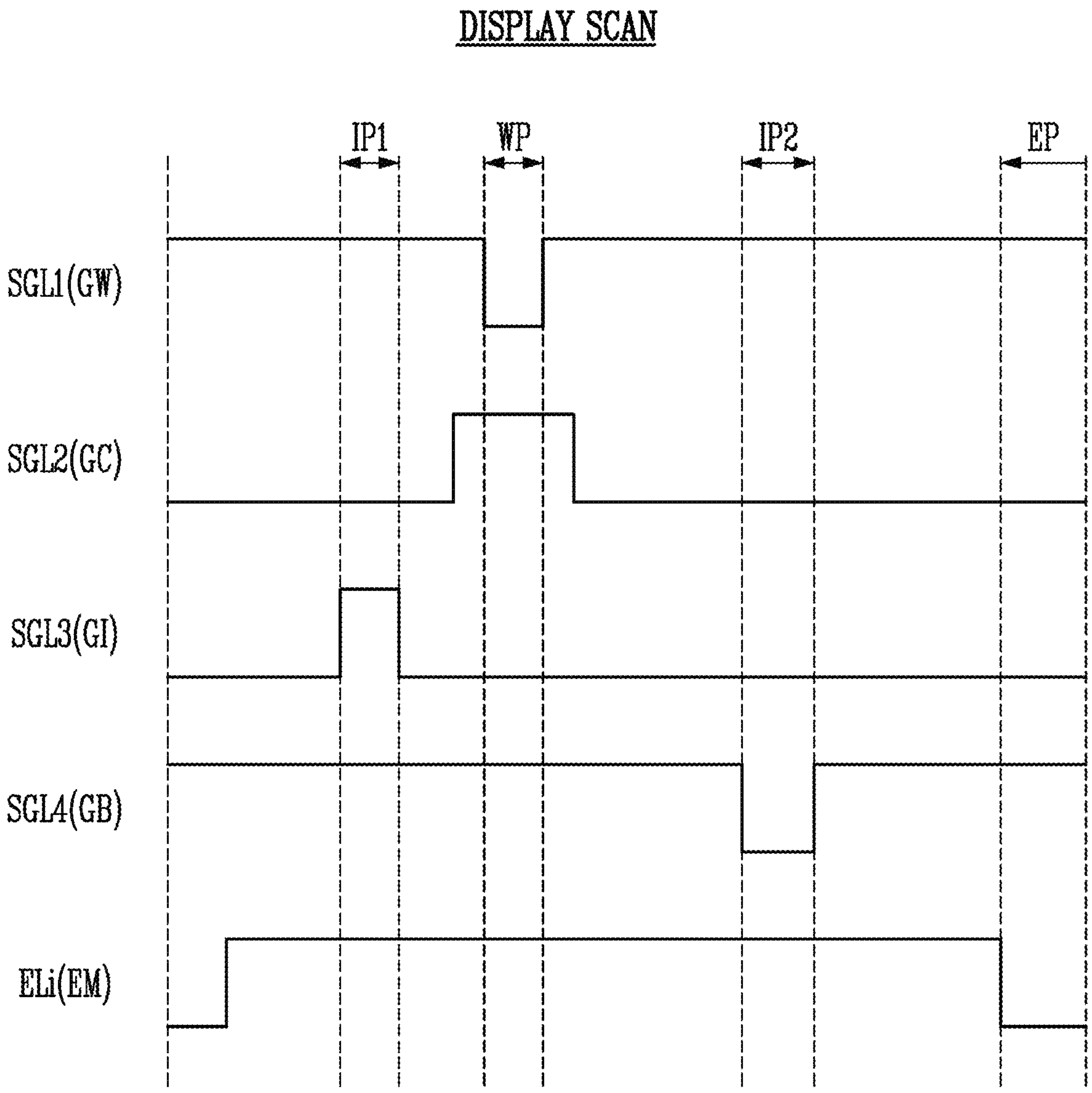
FIG. 5 is a timing diagram illustrating an example in which the display device of FIG. 1 performs a display scan operation.
Figure 6:
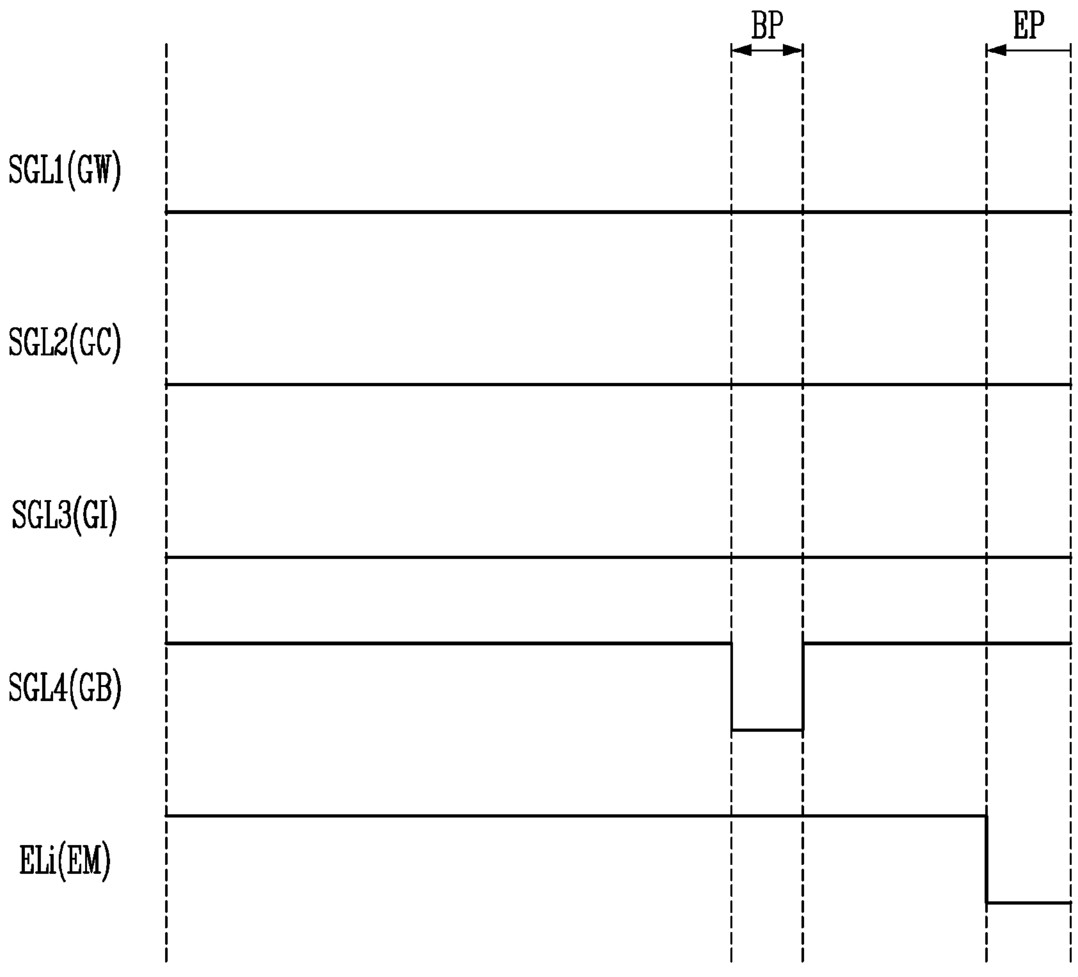
FIG. 6 is a timing diagram illustrating an example in which the display device of FIG. 1 performs a self scan operation.

FIG. 4 is a conceptual diagram illustrating a driving operation of the display device of FIG. 1, FIG. 5 is a timing diagram illustrating an example in which the display device of FIG. 1 performs a display scan operation, and FIG. 6 is a timing diagram illustrating an example in which the display device of FIG. 1 performs a self scan operation.

Referring to FIGS. 1 and 4, one frame may include a display scan period DISPLAY SCAN or a self scan period SELF SCAN.

During the display scan period DISPLAY SCAN, the display scan operation in which a data voltage VDATA is written may be performed, and during the self scan period SELF SCAN, the self scan operation in which the light emitting element emits light without writing the data voltage VDATA may be performed.

The display scan period DISPLAY SCAN may be continuously repeated during one frame at a maximum driving frequency (for example, in case that a driving frequency is 240 Hz) of the display panel 110.

At driving frequencies (that is, 120 Hz, 80 Hz, 60 Hz, and 48 Hz) excluding the maximum driving frequency (that is, it is assumed that the maximum driving frequency is 240 Hz in FIG. 4) of the display panel 110, the display scan period DISPLAY SCAN may be included in one frame, and the self scan period SELF SCAN may be included in at least one frame.

For example, the display scan period DISPLAY SCAN of one frame and the self scan period SELF SCAN of one frame may be repeated and the display scan period DISPLAY SCAN of one frame and the self scan period SELF SCAN of one frame (that is, a same image may be displayed during one driving frame) may configure one driving frame in case that the driving frequency is 120 Hz.

The display scan period DISPLAY SCAN of one frame and the self scan period SELF SCAN of two frames may be repeated and the display scan period DISPLAY SCAN of one frame and the self scan period SELF SCAN of two frames may configure one driving frame in case that the driving frequency is 80 Hz.

The display scan period DISPLAY SCAN of one frame and the self scan period SELF SCAN of three frames may be repeated and the display scan period DISPLAY SCAN of one frame and the self scan period SELF SCAN of three frames may configure one driving frame in case that the driving frequency is 60 Hz.

The display scan period DISPLAY SCAN of one frame and the self scan period SELF SCAN of four frames may be repeated and the display scan period DISPLAY SCAN of one frame and the self scan period SELF SCAN of four frames may configure one driving frame in case that the driving frequency is 48 Hz.

As described above, the driving controller 200 may vary a driving frequency by adjusting a length of the self scan period SELF SCAN.

Referring to FIG. 5, a frame including the display scan period DISPLAY SCAN may include a first initialization period IP1, a writing period WP, a second initialization period IP2, and an emission period EP.

In the first initialization period IP1, a third sub-gate signal GI may be supplied to the gate electrode of the fourth transistor T4 through the third sub-gate line SGL3.

Accordingly, the fourth transistor T4 may be turned on, and the first initialization voltage may be applied to the third node N3. That is, the gate electrode of the first transistor T1 is initialized with the first initialization voltage and maintained by the storage capacitor Cst.

For example, an initialization voltage may be a voltage sufficiently lower than the first power voltage. For example, the initialization voltage may be a voltage of a level equal to or similar to the second power voltage. Therefore, the first transistor T1 may be turned on.

In the writing period WP, a first sub-gate signal GW may be supplied to the gate electrode of the second transistor T2 through the first sub-gate line SGL1, and a second sub-gate signal GC may be supplied to the gate electrode of the third transistor T3 through the second sub-gate line SGL2.

Accordingly, the second transistor T2 and the third transistor T3 may be turned on, and the data voltage may be written to the storage capacitor Cst. At this time, the data voltage written to the storage capacitor Cst is a voltage in which a decrease of a threshold voltage of the first transistor T1 is reflected.

In the second initialization period IP2, a fourth sub-gate signal GB may be supplied to the gate electrode of the seventh transistor T7 and the gate electrode of the eighth transistor T8 through the fourth sub-gate line SGL4.

Accordingly, the seventh transistor T7 may be turned on, and the initialization voltage may be applied to the anode electrode of the light emitting element LD (that is, the fourth node N4). In addition, the eighth transistor T8 may be turned on, and the bias voltage may be applied to the first node N1.

In the emission period EP, an emission control signal EM may be supplied to the gate electrodes of the fifth transistor T5 and the sixth transistor T6 through the emission control line ELi.

Accordingly, the fifth transistor T5 and the sixth transistor T6 may be turned on, the first power voltage may be applied to the first transistor T1 to generate the driving current, and the driving current may be applied to the light emitting element LD. A driving current amount corresponds to the data voltage stored in the storage capacitor Cst.

At this time, because the driving current flows through the first transistor T1, the decrease of the threshold voltage of the first transistor T1 is reflected. Accordingly, because the decrease of the threshold voltage reflected in the data voltage Dm stored in the storage capacitor Cst and the decrease of the threshold voltage reflected in the driving current cancel each other out, the driving current corresponding to the data voltage may flow regardless of a threshold voltage value of the first transistor T1. According to the driving current amount, the light emitting element LD emits light with a desired luminance.

Referring to FIG. 6, a frame including the self scan period SELF SCAN may include a bias period BP and an emission period EP.

In the bias period BP, the fourth sub-gate signal GB may be supplied to the gate electrode of the seventh transistor T7 and the gate electrode of the eighth transistor T8 through the fourth sub-gate line SGL4. Accordingly, the seventh transistor T7 may be turned on, and the initialization voltage may be applied to the anode electrode (that is, the fourth node N4) of the light emitting element LD. In addition, the eighth transistor T8 may be turned on, and the bias voltage may be applied to the first node N1.

In the emission period EP, the emission control signal EM may have a turn-on level. Through the emission control line ELi, the emission control signal EM may be applied to the gate electrode of the fifth transistor T5 and the sixth transistor T6.

Accordingly, the fifth transistor T5 and the sixth transistor T6 may be turned on, the first power voltage may be applied to the first transistor T1 to generate the driving current, and the driving current may be applied to the light emitting element LD. That is, the light emitting element LD may emit light with a luminance corresponding to the driving current.

During the self scan period SELF SCAN, the sub-gate signals GW, GC, and GI may be maintained in an inactive state of a low level.

In addition, the fourth sub-gate signal GB that controls the seventh and eighth transistors T7 and T8 may be activated to initialize the first node N1 of the first transistor T1 and the anode electrode AE of the light emitting element LD during the self scan period SELF SCAN.

Accordingly, the data voltage written to the storage capacitor Cst during the self scan period SELF SCAN may not be changed. Therefore, the sub-pixel SPij may display a same image during the display scan period DISPLAY SCAN and the self scan period SELF SCAN, based on the data voltage supplied to the write period WP.

However, as a toggle of a sub-gate signal decreases during the self scan period SELF SCAN, a period of a clock signal provided to the gate driver that generates the sub-gate signal may be longer than a period of a clock signal provided to the gate driver during the display scan period DISPLAY SCAN.

Accordingly, a floating period of the gate driver may be increased, and a problem in which a difference of a turn-on level of the sub-gate signal output from the gate driver occurs between the self scan period and the display scan period may occur. A more detailed description of this is described later with reference to FIG. 7.

Figure 7:
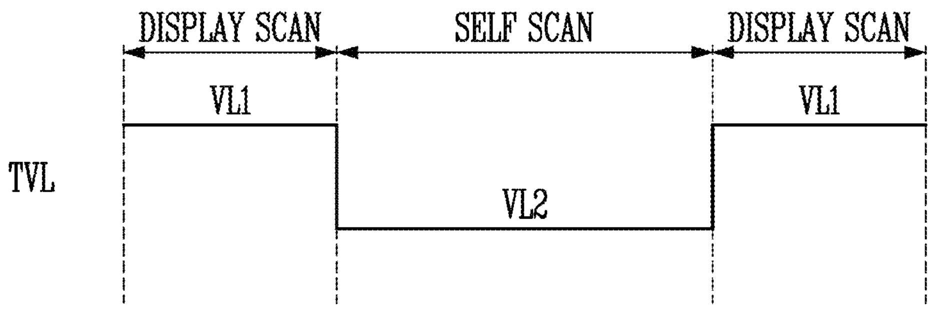
FIG. 7 is a timing diagram illustrating a turn-on level of a P-type transistor between the display scan period and the self scan period.

FIG. 7 is a timing diagram illustrating a turn-on level of a P-type transistor between the display scan period and the self scan period.

Referring to FIG. 7, a target voltage level TVL applied to a gate electrode of a transistor is shown. The target voltage level TVL may be a voltage level that turns on the P-type transistor. For example, the target voltage level TVL may be a turn-on level of the first sub-gate signal GW, the fourth sub-gate signal GB, and the emission control signal EM of FIG. 6. The target voltage level TVL may include a first voltage level VL1 and a second voltage level VL2.

During the display scan period DISPLAY SCAN, the target voltage level TVL may be the first voltage level VL1, and during the self scan period SELF SCAN, the target voltage level TVL may be the second voltage level VL2.

As supply of some sub-gate signals is stopped during the self scan period SELF SCAN, a toggle of the sub-gate signals may decrease. Accordingly, the target voltage level TVL output from the gate driver (or applied to the transistor of the sub-pixel) during the display scan period DISPLAY SCAN may drop from the second voltage level VL2 to the first voltage level VL1.

The first voltage level VL1 may be greater than the second voltage level VL2. For example, the first voltage level VL1 may be '−9.78 V' and the second voltage level VL2 may be '−9.8 V'.

Because the target voltage level TVL is different between the self scan period SELF SCAN and the display scan period DISPLAY SCAN, a luminance difference may occur between the self scan period SELF SCAN and the display scan period DISPLAY SCAN. That is, the luminance difference between the low-frequency driving and the high-frequency driving may be recognized by a user.

Figure 8:
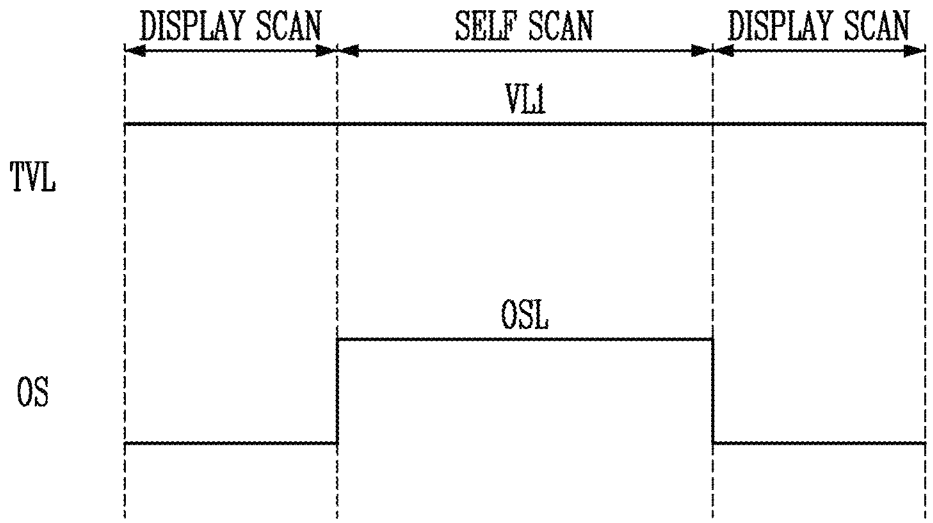
FIG. 8 is a timing diagram illustrating an offset voltage level applied to the self scan period.

FIG. 8 is a timing diagram illustrating an offset voltage level applied in the self scan period.

Referring to FIG. 8, the target voltage level TVL and an offset signal OS output from the voltage generator 140 during the self scan period SELF SCAN are shown.

The voltage generator 140 may generate the offset signal OS having the offset voltage level OSL during the self scan period SELF SCAN, based on the voltage control signal VCS of the controller 150.

The offset voltage level OSL may be equal to a difference between the first voltage level VL1 and the second voltage level VL2 of FIG. 7. For example, the offset voltage level may be '0.02 V' in case that the first voltage level VL1 may be '−9.78 V' and the second voltage level VL2 is '−9.8 V'.

The voltage generator 140 may apply the offset signal OS to the sub-gate line and the emission control line during the self scan period SELF SCAN.

According to some embodiments, during the self scan period SELF SCAN, the voltage generator 140 may apply the offset signal OS to the sub-gate line and the emission control line connected to a gate electrode of the P-type transistor. For example, referring to FIG. 3, the voltage generator 140 may apply the offset signal OS to the first sub-gate line SGL1, the fourth sub-gate line SGL4, and the emission control line ELi during the self scan period SELF SCAN.

In addition, according to some embodiments, the voltage generator 140 may provide the offset signal OS to the first sub-gate line SGL1 during a first bias period of the self scan period SELF SCAN, provide the offset signal OS to the fourth sub-gate line SGL4 during a second bias period of the self scan period SELF SCAN, and provide the offset signal OS to the emission control line ELi during the emission period EP of the self scan period SELF SCAN.

According to some embodiments, during the self scan period SELF SCAN, the voltage generator 140 may directly apply the offset signal OS to the gate electrode of the P-type transistor. For example, referring to FIG. 3, the voltage generator 140 may apply the offset signal OS to the gate electrode of the second transistor T2, the fifth transistor T5, the sixth transistor T6, the seventh transistor T7, and the eighth transistor T8 during the self scan period SELF SCAN.

Accordingly, the target voltage level TVL applied to the gate electrode of the P-type transistor during the self scan period SELF SCAN may be a sum of the second voltage level VL2 and the offset voltage level OSL. That is, during the self scan period SELF SCAN, the target voltage level TVL may be the first voltage level VL1.

Referring to FIG. 8, during the display scan period DISPLAY SCAN and the self scan period SELF SCAN, the target voltage level TVL may have the first voltage level VL1. That is, during the self scan period SELF SCAN, a turn-on level applied to the gate electrode of the P-type transistor of the sub-pixel SP may be the same as a turn-on level applied to the gate electrode of the P-type transistor of the sub-pixel SP during the display scan period DISPLAY SCAN.

According to some embodiments, the voltage generator 140 may not apply the offset signal OS to a sub-gate line and an emission control line connected to the gate electrode of the P-type transistor during the display scan period DISPLAY SCAN. According to some embodiments, the offset signal OS may be '0V' during the display scan period DISPLAY SCAN.

Accordingly, a luminance difference between the self scan period SELF SCAN and the display scan period DISPLAY SCAN may be prevented or reduced. That is, a luminance difference between low-frequency driving and high-frequency driving may be prevented or reduced, and image quality may be relatively improved.

With reference to FIG. 8, it has been described that the voltage generator 140 applies the offset signal OS to the gate electrode of the P-type transistor or applies the offset signal OS to the sub-gate line and the emission control line connected to the gate electrode of the P-type transistor, but the disclosure is not limited thereto, and the voltage generator 140 may output the offset signal OS to the gate driver 120.

Accordingly, the turn-on level of the sub-gate signal output from the gate driver 120 to the gate electrode of the P-type transistor during the self scan period SELF SCAN may have the first voltage level VL1.

Figure 9:
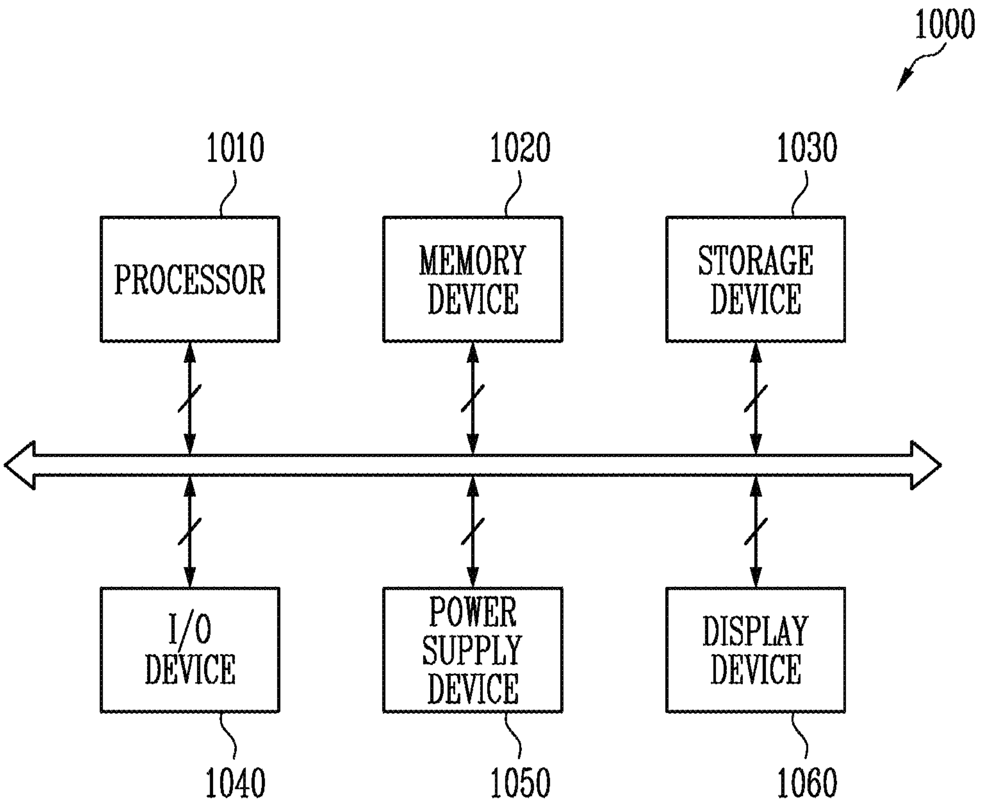
FIG. 9 is a block diagram illustrating an electronic device according to some embodiments of the disclosure.
Figure 10:
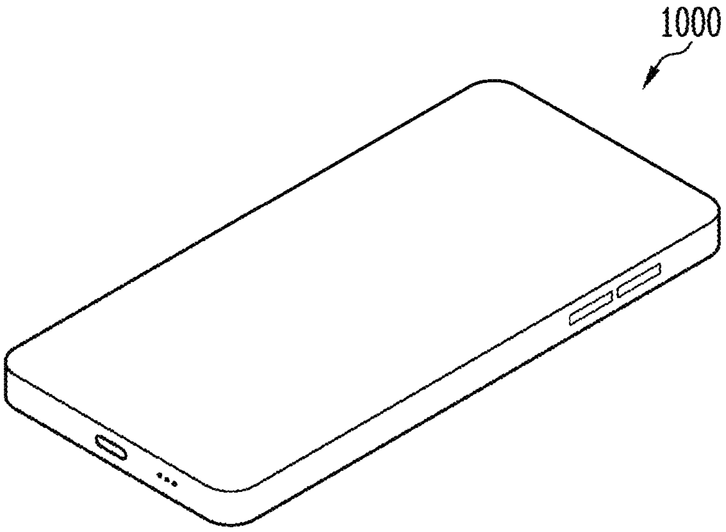
FIG. 10 is a diagram illustrating an example in which the electronic device of FIG. 9 is implemented as a smartphone.

FIG. 9 is a block diagram illustrating an electronic device according to some embodiments of the disclosure, and FIG. 10 is a diagram illustrating embodiments in which the electronic device of FIG. 9 is implemented as a smartphone.

Referring to FIGS. 9 and 10, the electronic device 1000 may include a processor 1010, a memory device 1020, a storage device 1030, an input/output device 1040, a power supply 1050, and a display device 1060. At this time, the display device 1060 may be the display device of FIG. 1. In addition, the electronic device 1000 may further include several ports capable of communicating with a video card, a sound card, a memory card, a USB device, or the like, or communicating with other systems. According to some embodiments, as shown in FIG. 10, the electronic device 1000 may be implemented as a smart phone. However, this is an example, and the electronic device 1000 is not limited thereto. For example, the electronic device 1000 may be implemented as a mobile phone, a video phone, a smart pad, a smart watch, a tablet PC, a vehicle navigation device, a computer monitor, a notebook computer, a head mounted display device, or the like.

The processor 1010 may perform specific calculations or tasks. According to some embodiments, the processor 1010 may generate the input image data IMG of FIG. 1 and the control signal CTRL for controlling display thereof.

According to some embodiments, the processor 1010 may be a microprocessor, a central processing unit, an application processor, or the like. The processor 1010 may be connected to other components through an address bus, a control bus, a data bus, or the like. According to some embodiments, the processor 1010 may also be connected to an expansion bus such as a peripheral component interconnect (PCI) bus.

The memory device 1020 may store data necessary for an operation of the electronic device 1000. For example, the memory device 1020 may include a non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM), and a ferroelectric random access memory (FRAM) device, a volatile memory device such as a dynamic random access memory (DRAM) device, a static random access memory (SRAM) device, and a mobile DRAM device, and/or the like.

The storage device 1030 may include a solid state drive (SSD), a hard disk drive (HDD), a CD-ROM, and the like.

The input/output device 1040 may include an input means such as a keyboard, a keypad, a touch pad, a touch screen, and a mouse, and an output means such as a speaker and a printer. According to some embodiments, the display device 1060 may be included in the input/output device 1040.

The power supply 1050 may supply power necessary for an operation of the electronic device 1000. For example, the power supply 1050 may be a power management integrated circuit (PMIC).

The display device 1060 may display images corresponding to visual information of the electronic device 1000. At this time, the display device 1060 may be an organic light emitting display device or a quantum dot light emitting display device, but is not limited thereto. The display device 1060 may be connected to other components through the buses or other communication links.

The scope of embodiments according to the present disclosure are not limited to the content described in the detailed description of the specification, but should be determined by the scope of the appended claims, and their equivalents. It should be interpreted that all changes or modifications derived from the meaning and scope of the appended claims and their equivalent concepts are included in the scope of embodiments according to the present disclosure.

What is claimed is:

1. A display device comprising:

a display panel including a sub-pixel connected to a first sub-gate line and a second sub-gate line;

a gate driver configured to supply a first sub-gate signal through the first sub-gate line and a second sub-gate signal through the second sub-gate line to the sub-pixel during a display scan period; and a voltage generator configured to provide an offset signal to the first sub-gate line during a self scan period in which supply of the second sub-gate signal is stopped, wherein the sub-pixel includes at least one transistor, a first voltage level is a turn-on voltage level of a sub-gate signal applied to a gate electrode of the at least one transistor during the display scan period, a second voltage level is a turn-on voltage level of the sub-gate signal applied to the gate electrode of the at least one transistor during the self scan period, and the offset signal has an offset voltage level that is a difference between the first voltage level and the second voltage level during the self scan period.

2. The display device according to claim 1, wherein the at least one transistor includes at least one P-type transistor.

3. The display device according to claim 1, wherein the offset signal has '0V' during the display scan period.

4. The display device according to claim 1, wherein the first voltage level is a turn-on voltage level of the first sub-gate signal output from the gate driver during the display scan period, and the second voltage level is a turn-on voltage level of the first sub-gate signal output from the gate driver during the self scan period.

5. The display device according to claim 4, wherein the sub-pixel comprises:

a first transistor connected between a first node and a second node configured to receive a first power voltage, including a gate electrode connected to a third node, and generating a driving current;

a second transistor configured to provide a data voltage to the first node in response to the first sub-gate signal; and a third transistor connecting the second node and the third node in response to the second sub-gate signal.

6. The display device according to claim 5, wherein the first voltage level is greater than the second voltage level.

7. The display device according to claim 5, wherein a turn-on voltage level applied to a gate electrode of the second transistor during the self scan period is a sum of the second voltage level and the offset voltage level.

8. The display device according to claim 7, wherein the turn-on voltage level applied to the gate electrode of the second transistor during the display scan period and the self scan period is the first voltage level.

9. The display device according to claim 8, wherein the first transistor and the second transistor are P-type transistors, and the third transistor is an N-type transistor.

10. The display device according to claim 9, wherein the sub-pixel comprises:

a fourth transistor connected between the third node and a first initialization voltage node, and having a gate electrode connected to a third sub-gate line;

a fifth transistor connected between a first power voltage node configured to receive the first power voltage and the first node, and having a gate electrode connected to an emission control line;

a sixth transistor connected between the second node and a fourth node, and having a gate electrode connected to the emission control line;

a seventh transistor connected between a second initialization voltage node and the fourth node, and having a gate electrode connected to a fourth sub-gate line;

an eighth transistor connected between a bias voltage node and the first node, and having a gate electrode connected to the fourth sub-gate line;

a storage capacitor connected between the first power voltage node and the third node; and a light emitting element connected between the fourth node and a second power voltage node, and configured to emit light based on a driving current received by the fourth node.

11. The display device according to claim 10, wherein the display scan period includes a first initialization period, a data writing period, a second initialization period, and an emission period, during the first initialization period, the gate driver is configured to supply a third sub-gate signal to the third sub-gate line, during the data writing period, the gate driver is configured to supply a first sub-gate signal to the first sub-gate line and to supply a second sub-gate signal to the second sub-gate line, during the second initialization period, the gate driver is configured to supply a fourth sub-gate signal to the fourth sub-gate line, and during the emission period, the gate driver is configured to supply an emission control signal to the emission control line.

12. The display device according to claim 11, wherein during the self scan period, the gate driver is configured to stop supply of the second sub-gate signal and the third sub-gate signal.

13. The display device according to claim 12, wherein the self scan period includes a bias period and an emission period, during the bias period, the gate driver is configured to supply the fourth sub-gate signal to the fourth sub-gate line, and during the emission period of the self scan period, the gate driver is configured to supply the emission control signal to the emission control line.

14. The display device according to claim 13, wherein the voltage generator is configured to provide the offset signal to the fourth sub-gate line during the bias period, and to provide the offset signal to the emission control line during the emission period of the self scan period.

15. The display device according to claim 14, wherein the fifth transistor, the sixth transistor, the seventh transistor, and the eighth transistor are P-type transistors, and the fourth transistor is an N-type transistor.

16. An electronic device comprising:

a processor configured to generate input image data and a control signal; and a display device configured to display an image, based on the input image data and the control signal, wherein the display device comprises:

a display panel including a sub-pixel connected to a first sub-gate line and a second sub-gate line;

a gate driver configured to supply a first sub-gate signal through the first sub-gate line and a second sub-gate signal through the second sub-gate line to the sub-pixel during a display scan period;

a voltage generator configured to provide an offset signal to the first sub-gate line during a self scan period in which supply of the second sub-gate signal is stopped; and a controller configured to control the display panel, the gate driver, and the voltage generator, based on the input image data and the control signal, wherein the sub-pixel includes at least one transistor, a first voltage level is a turn-on voltage level of a sub-gate signal applied to a gate electrode of the at least one transistor during the display scan period, a second voltage level is a turn-on voltage level of the sub-gate signal applied to the gate electrode of the at least one transistor during the self scan period, and the offset signal has an offset voltage level that is a difference between the first voltage level and the second voltage level during the self scan period.

17. The electronic device according to claim 16, wherein the at least one transistor includes at least one P-type transistor.

18. The electronic device according to claim 16, wherein the first voltage level is a turn-on voltage level of the first sub-gate signal output from the gate driver during the display scan period, and the second voltage level is a turn-on voltage level of the first sub-gate signal output from the gate driver during the self scan period.

19. The electronic device according to claim 18, wherein the sub-pixel comprises:

a first transistor connected between a first node and a second node configured to receive a first power voltage, including a gate electrode connected to a third node, and to generate a driving current;

a second transistor configured to provide a data voltage to the first node in response to the first sub-gate signal; and a third transistor connecting the second node and the third node in response to the second sub-gate signal.

20. The electronic device according to claim 19, wherein a turn-on voltage level applied to a gate electrode of the second transistor during the self scan period is a sum of the second voltage level and the offset voltage level.

* * * * *